(12) United States Patent
Xu et al.

(10) Patent No.: US 12,193,375 B2
(45) Date of Patent: Jan. 14, 2025

(54) PERSONALIZED PLANT CARE METHOD AND SYSTEM, AND READABLE STORAGE MEDIUM

(71) Applicant: Hangzhou Ruisheng Software Co., Ltd., Zhejiang (CN)

(72) Inventors: Qingsong Xu, Zhejiang (CN); Qing Li, Zhejiang (CN)

(73) Assignee: Hangzhou Ruisheng Software Co., Ltd., Zhejiang (CN)

( * ) Notice: Subject to any disclaimer, the term of this patent is extended or adjusted under 35 U.S.C. 154(b) by 0 days.

(21) Appl. No.: 18/433,402

(22) Filed: Feb. 6, 2024

(65) Prior Publication Data

US 2024/0172600 A1    May 30, 2024

Related U.S. Application Data

(63) Continuation of application No. PCT/CN2023/090269, filed on Apr. 24, 2023.

(30) Foreign Application Priority Data

May 11, 2022 (CN) .......................... 202210537096.X
May 11, 2022 (CN) .......................... 202210537097.4

(51) Int. Cl.
    *A01G 7/06*      (2006.01)
    *G06V 20/10*      (2022.01)

(52) U.S. Cl.
     CPC ............. *A01G 7/06* (2013.01); *G06V 20/188* (2022.01)

(58) Field of Classification Search
     CPC ................................ A01G 7/06; G06V 20/188
     See application file for complete search history.

(56) References Cited

U.S. PATENT DOCUMENTS

2002/0059186 A1   5/2002   Weber et al.
2015/0081058 A1*   3/2015   Oliver ................. A63F 9/24
                                                     700/91

(Continued)

FOREIGN PATENT DOCUMENTS

CN     105069505     11/2015
CN     106447297     2/2017

(Continued)

OTHER PUBLICATIONS

"Office Action of China Counterpart Application, Application No. 202210537097.4", issued on Feb. 19, 2024, with English translation thereof, p. 1-p. 12.
"Office Action of China Counterpart Application, Application No. 202210537096.X", issued on Feb. 20, 2024, with English translation thereof, p. 1-p. 10.

(Continued)

*Primary Examiner* — Kidest Bahta
(74) *Attorney, Agent, or Firm* — JCIPRNET

(57) ABSTRACT

The present disclosure provides a personalized plant care method and system, and a readable storage medium. The method includes: receiving a plant added by a user, and obtaining attribute information of the plant; determining an initial care scheme of the plant according to the attribute information of the plant; obtaining care skill level information of the current user to adjust the initial care scheme, so as to determine a personalized care scheme of the plant; and outputting the personalized care scheme of the plant to the current user.

16 Claims, 4 Drawing Sheets

(56) References Cited

U.S. PATENT DOCUMENTS

| | | | | |
|---|---|---|---|---|
| 2015/0347544 | A1* | 12/2015 | Caraballoso | G06F 3/0482 |
| | | | | 707/738 |
| 2016/0005007 | A1* | 1/2016 | Marsico | G06Q 10/20 |
| | | | | 705/305 |
| 2020/0104777 | A1 | 4/2020 | Bouhini et al. | |
| 2020/0167909 | A1* | 5/2020 | Barrasso | G06T 7/0004 |
| 2020/0344965 | A1* | 11/2020 | Song | H05B 47/16 |
| 2021/0350235 | A1* | 11/2021 | Levi | G06F 16/53 |
| 2021/0378182 | A1 | 12/2021 | Xu et al. | |

FOREIGN PATENT DOCUMENTS

| | | |
|---|---|---|
| CN | 109753971 | 5/2019 |
| CN | 110199845 | 9/2019 |
| CN | 112184789 | 1/2021 |
| CN | 113837707 | 12/2021 |
| CN | 113947269 | 1/2022 |
| CN | 114898344 | 8/2022 |
| CN | 114998875 | 9/2022 |
| JP | 2021140787 | 9/2021 |
| KR | 20150060507 | 6/2015 |
| KR | 20200011077 | 2/2020 |
| WO | 2006102246 | 9/2006 |
| WO | 2020012259 | 1/2020 |

OTHER PUBLICATIONS

"International Search Report (Form PCT/ISA/210) of PCT/CN2023/090269", mailed on Jul. 22, 2023, with English translation thereof, pp. 1-6.

"Written Opinion of the International Searching Authority (Form PCT/ISA/237) of PCT/CN2023/090269", mailed on Jul. 22, 2023, pp. 1-4.

"Office Action of China Counterpart Application", issued on Nov. 4, 2023, p. 1-p. 8.

"Office Action of China Counterpart Application", issued on Nov. 6, 2023, p. 1-p. 8.

Daiyi Lin et al., "Application of GPs-based plant guide system in teaching and popular science guide", Modern horticulture, Feb. 2020, pp. 1-5.

Lian, Ying-Zhan et al., "An Image-Based Diagnostic Expert System for Crop Pests and Diseases", Modern Computer, No. 18, Jun. 25, 2012, with English abstract thereof, pp. 1-4.

Wah Kwok, "Research on Wheat Cultivation and Pest Control Technology", Agriculture and Technology, vol. 35, No. 04, Feb. 28, 2015, with English translation thereof, pp. 1-3.

Zhen, Zhumi et al., "Aquaculture information recommendation based on collaborative filtering algorithm and web logs", Transactions of the Chinese Society of Agricultural Engineering, vol. 33, Supp. 1, Feb. 15, 2017, with English translation thereof, pp. 1-18.

* cited by examiner

PERSONALIZED PLANT CARE METHOD AND SYSTEM, AND READABLE STORAGE MEDIUM

CROSS-REFERENCE TO RELATED APPLICATIONS

This application is a continuation of international PCT application serial no. PCT/CN2023/090269, filed on Apr. 24, 2023, which claims the priority benefit of China application no. 202210537096.X, filed on May 11, 2022 and China application no. 202210537097.4, filed on May 11, 2022. The entirety of each of the above-mentioned patent applications is hereby incorporated by reference herein and made a part of this specification.

BACKGROUND

Technical Field

The present disclosure relates to the technical field of object identification, and in particular to a personalized plant care method and system, and a readable storage medium.

Description of Related Art

The current plant care schemes are determined based on type of plants, that is, the plant species information is obtained first, and then the care scheme is determined based on the species. The impact of the caregiver on plant care is not taken into account. The impact of the caregiver on plant care includes: different caregivers have different care skill levels and different levels of understanding of plants. For example, for users with lower care skill levels, the care scheme may be properly adjusted by reducing difficult care tasks such as pruning, repotting, changing pots, adjusting temperature, adjusting humidity, and preparing for winter.

SUMMARY

One of the purposes of this disclosure is to provide a personalized plant care method to assist users in taking care of plants, and the method includes:
  receiving a plant added by a user and obtaining attribute information of the plant;
  determining an initial care scheme for the plant according to the attribute information of the plant;
  obtaining care skill level information of the current user to adjust the initial care scheme, so as to determine a personalized care scheme for the plant;
  outputting the personalized care scheme for the plant to the current user.

According to another aspect of the present disclosure, a personalized plant care method according to user's needs is provided, and the method includes:
  receiving a plant added by a user and obtaining attribute information of the plant;
  determining an initial care scheme for the plant according to the attribute information of the plant;
  obtaining care skill level information of the current user and obtaining the user's care expectation for the plant to adjust the initial care scheme, so as to determine a personalized care scheme for the plant;
  outputting the personalized care scheme for the plant to the current user.

According to another aspect of the present disclosure, a personalized plant care system for assisting users in taking care of plants is provided, and the system includes a processor and a memory. A program is stored in the memory. When the program is executed by the processor, the above steps of the personalized plant care method as described above is implemented.

According to another aspect of the present disclosure, a readable storage medium is provided, in which a program is stored, and when the program is executed, the personalized plant care method as described above is implemented.

Other features and advantages of the present disclosure will become more apparent from the following detailed description of exemplary embodiments of the present disclosure with reference to the accompanying drawings.

BRIEF DESCRIPTION OF THE DRAWINGS

The accompanying drawings, which are incorporated in and constitute a part of this specification, illustrate embodiments of the disclosure and, together with the description, serve to explain principles of the disclosure.

The present disclosure may be more clearly understood from the following detailed description with reference to the accompanying drawings, wherein.

Figure 1:
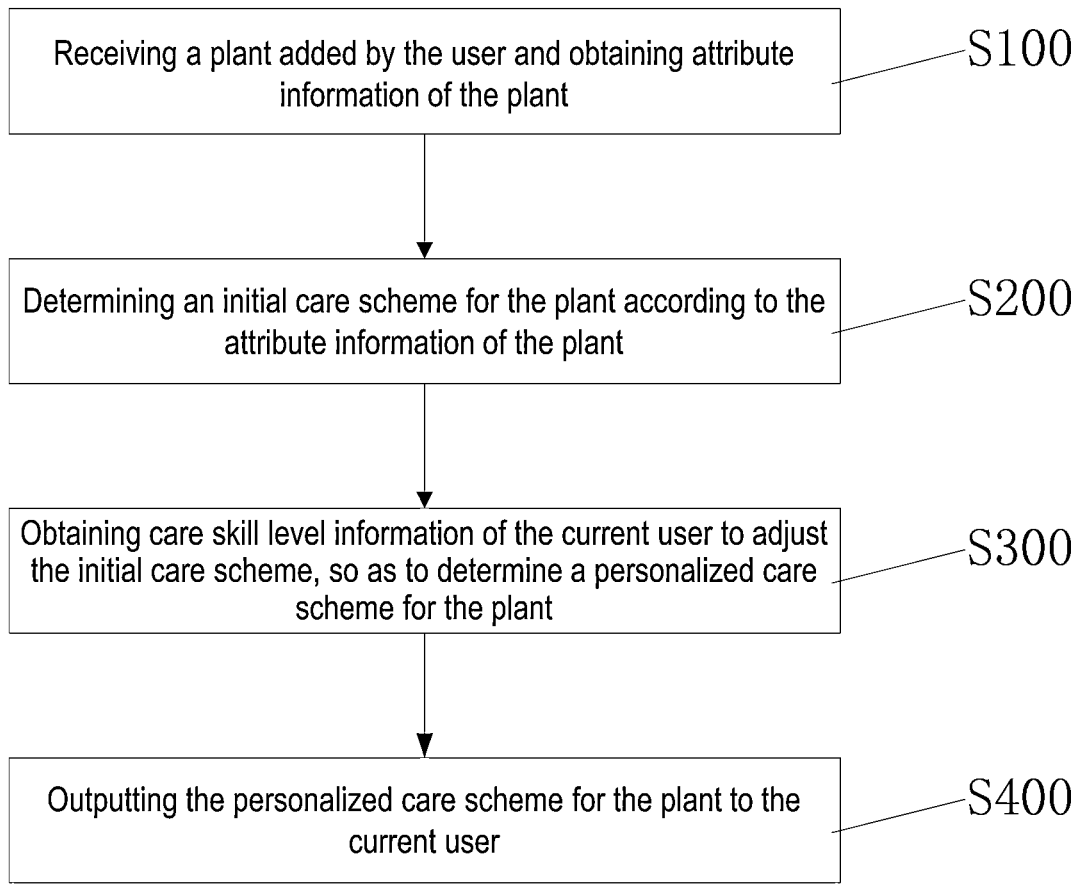
FIG. 1 shows a schematic flowchart of a personalized plant care method for assisting users in taking care of plants according to an embodiment of the present disclosure.

Note that in the embodiments described below, the same reference numerals are sometimes commonly used between different drawings to represent the same parts or parts having the same functions, and repeated description thereof is omitted. In some instances, similar numbers and letters are used to refer to similar items such that once an item is defined in one figure, it does not require further discussion in subsequent figures.

In order to facilitate understanding, the positions, dimensions, ranges, etc. of each structure shown in the drawings and the like may not represent the actual positions, dimensions, ranges, etc. Therefore, the present disclosure is not limited to the positions, dimensions, ranges, etc. disclosed in the drawings and the like.

DESCRIPTION OF THE EMBODIMENTS

Various exemplary embodiments of the present disclosure will be described in detail below with reference to the accompanying drawings. It should be noted that the relative arrangement of components and steps, numerical expressions, and numerical values set forth in these examples do not limit the scope of the disclosure unless otherwise specifically stated.

The following description of at least one exemplary embodiment is merely illustrative in nature and is in no way intended to limit the disclosure, its application or uses. That is, the structures and methods herein are shown in an exemplary manner to illustrate different embodiments of the structures and methods in the present disclosure. However, those skilled in the art will understand that they are merely illustrative of exemplary ways in which the disclosure may be practiced, and are not exhaustive. Furthermore, the drawings are not necessarily to scale and some features may be exaggerated to illustrate details of particular components.

Techniques, methods and devices known to those of ordinary skill in the relevant art may not be discussed in detail, but where appropriate, such techniques, methods and devices should be considered part of the specification.

In all examples shown and discussed herein, any specific values are to be construed as illustrative only and not as limiting. Accordingly, other examples of the exemplary embodiments may have different values.

Example 1

FIG. 1 shows a schematic flowchart of a personalized plant care method for assisting users in taking care of plants according to an embodiment of the present disclosure. This method may be implemented in an application (app) installed on a smart terminal such as a mobile phone or tablet computer. As shown in FIG. 1, the method includes:

Step S100: receiving a plant added by a user and obtaining attribute information of the plant; Step S200: determining an initial care scheme for the plant according to the attribute information of the plant;

Step S300: obtaining care skill level information of the current user to adjust the initial care scheme, so as to determine a personalized care scheme for the plant;

Step S400: outputting the personalized care scheme for the plant to the current user.

In some embodiments, the step of receiving the plant added by the user and obtaining attribute information of the plant includes one of the following:

receiving a plant picture added by a user, identifying and obtaining attribute information of the plant in the plant picture;

receiving the historical plant identification result added by the user, and obtaining the attribute information of the historical identified plant;

receiving the searched plant result added by the user, and obtaining the attribute information of the searched plant.

After receiving the plant picture added by the user, the attribute information of the plant in the plant picture may be identified based on the species identification model established through pre-sample training.

The species identification model may be a neural network model, specifically a convolutional neural network model or a residual network model. The convolutional neural network model is a deep feed-forward neural network, which uses convolution kernels to scan species images, extract multiple features to be identified from the species images, and then identify the features to be identified of the species. In addition, in the process of identifying species images, the original species images may be directly input into the convolutional neural network model without preprocessing the species images. Compared with other identification models, the convolutional neural network model has higher identification accuracy and identification efficiency.

In comparison, the residual network model has identity mapping layers, whereas the convolutional neural network model does not have one, so it is possible for the residual network model to avoid accuracy saturation or even decline as the network depth (number of stacked layers in the network) increases. The identity mapping function of the identity mapping layer in the residual network model needs to satisfy: the sum of the identity mapping function and the input of the residual network model is equal to the output of the residual network model. After the identity mapping is introduced, the residual network model changes the output more obviously, so it is possible to significantly improve the accuracy and efficiency of species feature identification, thereby improving the identification accuracy and identification efficiency of attribute information of plants.

In some embodiments, training a species identification model may include:

obtaining a first sample set having a preset number of species images marked with multiple feature information;

determining a certain proportion of species images from the first sample set as the first training set;

using the first training set to train the species identification model and obtaining the first training accuracy rate; and ending the training when the first training accuracy rate is greater than or equal to the first preset accuracy rate, and obtaining the trained species identification model.

Specifically, the first sample set may include a large number of species images, and each species image is marked with its corresponding multiple features. Species images are input into the species identification model to generate output feature information, and then the relevant parameters in the species identification model may be adjusted according to the comparison result between the output feature information and the marked feature information, that is, the species identification model is trained until the first training accuracy rate of the species identification model is greater than or equal to the first preset accuracy rate, then the training ends, thereby obtaining the trained species identification model. According to a species image, the species identification model may also output multiple candidate features, wherein each candidate feature may have a corresponding feature confidence pending further analysis and screening.

Furthermore, the trained species identification model may also be tested, which may specifically include:

determining a certain proportion of species images from the first sample set as the first test set;

determining a first model accuracy rate of the trained species identification model using the first test set; and adjusting the first training set and/or the species identification model for retraining when the first model accuracy rate is less than the second preset accuracy rate.

In general, the species images in the first test set and the first training set are not exactly the same, so the first test set may be used to test whether the species identification model also has a good identification effect on species images other than those in the first training set. During the test process, the first model accuracy rate of the species identification model is calculated by comparing the output feature information generated according to the species images in the first test set and the marked feature information. In some examples, the calculation method of the first model accuracy rate may be the same as the calculation method of the first training accuracy rate. When the first model accuracy rate obtained from the test is less than the second preset accuracy rate, it indicates that the identification effect of the species identification model is not good enough, so the first training set may be adjusted. Specifically, for example, the number of species images marked with feature information in the first training set may be increased, or the species identification model itself may be adjusted, or both of the above are adjusted, then the object identification model is retrained to improve the identification effect thereof. In some embodiments, the second preset accuracy rate may be set equal to the first preset accuracy rate.

In some embodiments, historical plant identification results added by users may also be received. For example, the plant that the user has been taking care of and whose species information has been identified before may be added directly on the historical identification results page or the My Plants page as a personalization care scheme. For the plants added in this way, it is possible to directly obtain the attribute information thereof without having to perform identification again.

In addition, users may also add plants that require personalized care scheme settings by searching for plants, for example, searching by plant name to obtain attribute information of the plant.

The attribute information of the plant includes the species name information of the plant. Further, the attribute information of the plant may also include the growth phase information of the plant. The growth phase may include one of seed/seedling phase, growth phase, flowering phase, fruit phase, dormant phase, and dry phase. The growth phase of a plant may be identified based on a neural network model established through sample training in advance, which may be a separate identification model, or the same model integrated with the species identification model. Obtaining information about a plant's growth phase may make it possible to personalize plant care schemes more accurately.

Furthermore, the attribute information of the plant also includes plant status information, such as whether the plant is in good growth status, whether the plant has just been transplanted, whether the plant is in a sick state, and how strong and dense the plant is. The plant status information may be obtained through a separate identification model or the same model that is integrated with the species identification model, and may be obtained by means of the user's input through an interactive method. Through the obtained plant status information, the current growth status of the plant may be obtained, so that the current plant care scheme may be more accurately personalized according to different situations.

In some embodiments, determining the initial care scheme for the plant based on the attribute information of the plant further includes:

determining an initial care scheme for the plant based on the attribute information of the plant, the user's location information and/or the current time information.

After obtaining the species attribute information such as the species name information and growth phase information of the user's plant, the care information may be obtained from the plant care information database associated with the plant, and then combined with the user's location information and current time information, it is possible to obtain the plant location information and seasonal information to determine the initial care scheme for the plant.

The location information of the user may be determined by the location information when the plant image is uploaded. The location information includes but is not limited to GPS information. Specifically, the user's current location information is obtained when the user uploads the plant image. If the user's current location information is displayed as "The Bund, Shanghai", it may be determined that the user's geographical information is Shanghai, China. If the user's current location information is displayed as "Columbia University, New York State", it is determined that the user's geographical information is New York State, United States. The user's location information may be divided into hierarchical attributes of multiple regions based on a range from small to large. For example, the user's current location information is Binjiang District, Hangzhou City, Zhejiang Province, China, and its multiple hierarchical attributes may be Binjiang District, Hangzhou City, Zhejiang Province, China, East Asia, Asia and the like.

The user's location information and current time information are not required information, but obtaining the user's location information makes it possible to determine the location information of the plant, and the current time information makes it possible determine the seasonal information. Different climate features are found in different locations and different seasons, and different care schemes or special attention may be applied to adapt to different climate features. For example, a hot tropical climate requires more watering during the dry season, so that the initial care scheme for the corresponding plant may be initially adjusted to determine the initial care scheme for the plant.

In some embodiments, the care skill level information is confirmed based on the current user's historical care information. The user's care skill level information and understanding of plants may be obtained by identifying the user's historical plant care records, such as obtaining the type information of the user's historical care plants (when there are plants that are difficult to care among the care types, the user's care skill level may be considered to be high), obtaining the user's care data, such as the frequency and time of care (if the frequency of care is higher and the time is longer, the user's care skill level may be considered to be high). The user's care skill level information may also be determined by identifying and obtaining the health status and plant status of the plants taken care of by the user. The health status of the plants taken care of by the user may be identified through the plant disease and pest identification model established through corresponding pre-sample training, thereby obtaining the information of the plant taken care of by the user, such as health condition including whether plant has pests and diseases and the level of pests and diseases. The status of the plants taken care of by the user may be identified and confirmed through the plant status identification model established through corresponding pre-sample training. The status of the plants may be divided into multiple levels from high to low, such as excellent, good, average, and relatively low. Growth status may also be scored and divided into multiple levels according to segments of scores. Depending on the health status and plant status of the plants taken care of by the user, various data may be integrated to determine the user's care skill level information. For example, the care skill level may be divided into multiple different levels (such as hopeless, beginner, experienced, skilled and master, etc.). Different personalized plant care schemes may be set for different users with different care skill levels. Alternatively, depending on the current user's actual care skill level information, different levels may be categorized. Furthermore, corresponding plan adjustments may be made for each situation, thereby customizing a personalized care scheme suitable for each user.

Figure 3:
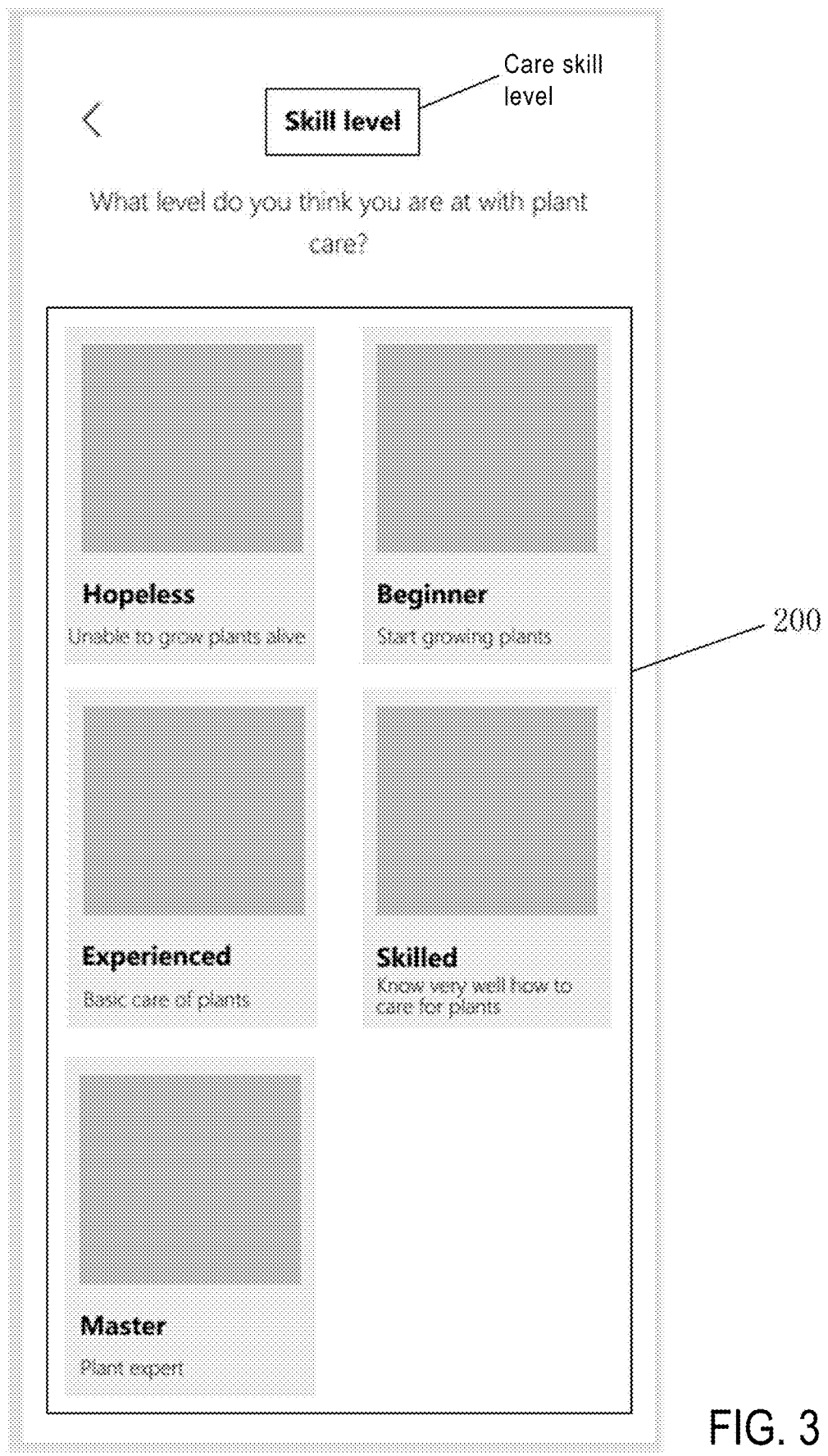
FIG. 3 is a schematic diagram of a user-defined care skill level label according to an embodiment of the present disclosure.

In some embodiments, the care skill level information is confirmed based on interactive question answer information and/or customized care capability label information submitted by the current user. The user's care skill level information may be determined by providing interactive questions, such as using a questionnaire to allow the user to select answers to multiple questions to obtain corresponding data, thereby comprehensively determining the user's care skill level. In addition, the user may also evaluate his/her own care skill level to customize the care skill level label. As shown in FIG. 3, the user may click to select the care skill level evaluated by himself/herself among multiple care skill level labels 200, including: Hopeless, Beginner, Experienced, Skilled, and Master, etc. In addition, care operation labels may be added to the corresponding users based on the specific operation records in the user's historical care data. For example, if a user has repotting operations in the historical care records, the user may be given a care operation label with the ability to repot, and the care schemes having repotting operation will be retained for the user. For users who do not have the ability to repot, the repot operation may be deleted from the corresponding care schemes.

Care operations may include, for example, at least one of watering, spraying, changing water, adding water, fertilizing, changing soil, pruning, weeding, transferring pots, repotting, sunlight, shading, adjusting temperature, adjusting humidity, preparing for winter, applying pesticides, and applying a fungicide. Each operation may also be divided into subcategories, such as fertilization, which may include subcategories like application of slow-release fertilizer, water-soluble fertilizer, liquid fertilizer, etc., and the execution frequency of different subcategories may be different. By subdividing care operations into subcategories, a suitable personalized care scheme for plants may be more accurately formulated. Subcategories of recommended care operations may be determined based on species and growth phases of plants, or subcategories of recommended care operations may be determined based on preferences input by the user. When the user's historical care data has been processed by a subcategory of a care operation, a label indicating the care capability in the subcategory of this care operation may be added to the user to facilitate the subsequent designation of the corresponding personalized care scheme to the user.

After obtaining the current user's care skill level information, the information is utilized to adjust the initial care scheme, that is, care operations that do not meet the current user's care skill level are deleted from the scheme or the corresponding care operations are reduced, thereby determining the personalized care scheme for the plant, and the personalized care scheme for the plant is output to the current user. After obtaining the user's care skill level information, a personalized care scheme for the plant may be customized for the user, that is, the initial care scheme is determined based on the plant species information to be taken care of, and the care scheme is adjusted based on the user's care skill level. The initial care scheme corresponding to different plant species may be pre-stored in the database of the content management system (CMS). For example, if it is identified that the plant to be taken care of is Golden Pothos (*Epipremnum aureum*), and the user wants to hydroponic Pothos and has made a selection, the corresponding care scheme may be matched in the CMS and pushed to the user. In addition, corresponding to the identified user care ability label, the care scheme may also be adjusted. If the user does not have the ability to prune plants, the pruning step in the care scheme may be removed or replaced with other simple methods. It is also possible to use historical care data or plant status scores to determine the user's care skill level information to adjust the scheme, or interactive questions about care for Pothos may be utilized to determine the user's care skill level information, thereby adjusting the personalized care scheme for the plant.

In some embodiments, the personalized plant care method of assisting users in taking care of plants further includes the following.

The user's care environment information is obtained to adjust the initial care scheme, thereby determining the personalized care scheme for the plant. Care environment information may include weather, temperature, humidity, soil moisture, light intensity, different care locations such as indoor location or outdoor location, etc. Care environment information may be obtained in different ways. For example, environment information such as weather, temperature, humidity, etc. may be automatically obtained through the Internet. Light intensity may be obtained from devices with photometer functions. Care location information may be identified and obtained based on pre-trained neural network models. The above care environment information may also be provided by users through interactive questions. In the meantime, when it is identified (or the user actively provides information) that the care environment conditions have changed, it is also possible to promptly remind the user to adjust the care scheme. For example, when transferring plants from indoors to outdoors, the care scheme needs to be adjusted.

When a user has multiple plants to be taken care of, in order to facilitate the user to perform care tasks, the planned execution dates of each task in different care schemes may be automatically adjusted. The adjustment target may include, for example, reducing the number of days that the user needs to do the task, thereby making overall adjustment to the associated personalized care scheme for multiple plants to be taken care of by the user. For example, if a task can be completed in one day, the task should be arranged to be done in one day. The care tasks scheduled on the same day may be the same type of care tasks, or they may be different care tasks, for example, they may include watering and fertilizing. It is also possible to try to arrange tasks on rest days such as weekends and statutory holidays. In some embodiments, the method further includes: determining whether the determined planned execution date of the care task meets the conditions for adjusting to the target date. If the conditions are met, the planned execution date of the care task will be adjusted to the target date. The target date may be a rest day closest to the planned execution date of the care task (so that the care task may be most possibly arranged on a rest day), a date that does not conflict with the user's schedule (for example, the user's schedule may be obtained by invoking applications such as calendar, so that care tasks may be scheduled on dates when the user has no outing arrangements), or the planned execution date of another care task of which the planned execution date is closest to the planned execution date of the care task (so that the care tasks that were originally planned to be performed on different dates may be most possibly arranged on the same day). In some embodiments, the conditions for adjusting the planned execution date of the care task to the target date may include: the planned execution interval indicated by the planned execution frequency of the care task is greater than 5 days, and the number of days between the planned execution date and the target date of the care task is less than 20% of the planned execution interval. According to these embodiments, for tasks of which the planned execution interval is 5 days or less, the planned execution date is not adjusted. Tasks with a planned execution interval greater than 5 days may be adjusted, and the adjustment range is less than 20% of the planned execution interval.

In some cases, users may take care of multiple plants of the same species. In some embodiments, if the species of the plant for which the personalized care scheme is currently formulated is consistent with the species of the previous plant directed at by the previously formulated personalized care scheme, then the care scheme for the current plant and the care scheme for the previous plant will be combined, and reminders to perform corresponding care tasks will be output at the same scheduled time according to the combined care personalization. In this way, it is possible to help users care and manage plants of the same type in batches.

In some embodiments, the method may further include: obtaining weather information on a date with a care task, and in addition to outputting a reminder of the care task, weather information related to the care task and a care prompt related to the weather information are also output. Weather information may include sunny/cloudy/rainy/snow conditions, as well as temperature and humidity. In an example, if there is a watering task today, and the plant is kept outdoors, and the weather information obtained shows that the probability of precipitation is high today, then a care prompt is output to remind the user that there will be precipitation today in addition to outputting a reminder of the watering task for the plant, so as to notify the user to pay attention to cancel the watering task or reduce the amount of watering, thereby dynamically adjusting the user's personalized care scheme.

In some embodiments, the method may also include: regularly visiting the user to obtain the growth status of the plants, and adjusting the personalized care scheme according to the growth status of the plants. It is possible to set up regular return visits for each plant. The set return visit date for a certain plant may include outputting a return visit question, and/or prompting the user to input an updated picture of the plant. The growth phase of the plant may be identified through the plant identification model described above, and/or the health status and disease and pest information of the plant may be identified through the plant state model and plant disease and pest identification model described above, thereby obtaining the growth status of the plant. The growth status of the plant may also be identified through a trained plant growth status identification model that is separate from the above model. The plant care scheme is dynamically adjusted according to the plant's growth status. In an example, although the user performed the operation on time according to the watering task reminder, since the user did not control the watering well and there was too much or too little watering, and the result will be reflected in the status of the plant. Therefore, through the updated picture of the plant obtained during the return visit, it is possible to identify whether the frequency of watering tasks needs to be increased or decreased, and/or the user may be reminded to increase or decrease the amount of watering, etc. In an example, it can be found through return visits that there is a lack of light for the plant, and the user may be reminded to change the care location, or add extra care tasks such as supplementing regular light to the care scheme. Similarly, the execution status of care tasks such as fertilization, insect control, and sterilization may also be determined based on the identification results of return visit pictures (that is, the growth status of the plants), so as to adjust the subsequent care scheme for the plants. Moreover, during return visits, interactive questions may also be output for users to choose to assist the application in making judgments, thereby more accurately adjusting the user's personalized care scheme.

Example 2

Figure 2:
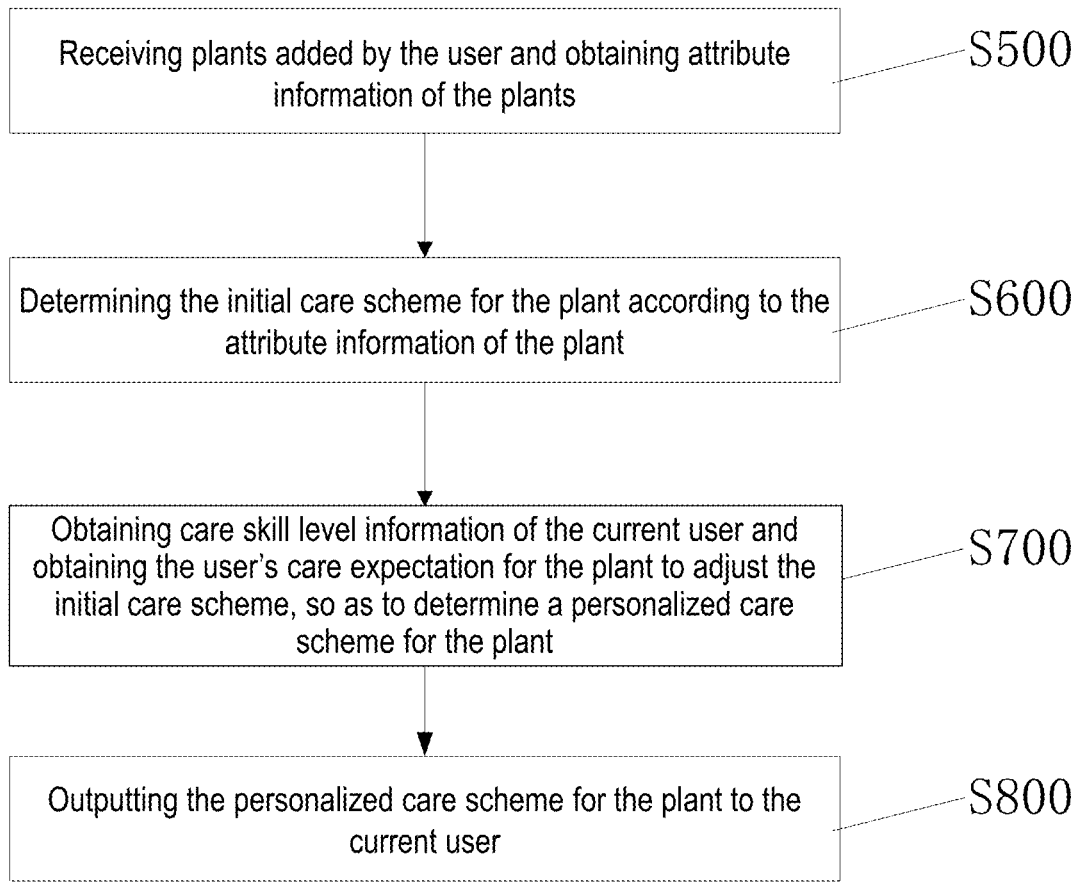
FIG. 2 shows a schematic flowchart of a personalized plant care method according to user's needs according to an embodiment of the present disclosure.

The main difference between Example 2 and the Example 1 is that the user's care expectations for the plant are also obtained to adjust the initial care scheme, thereby determining the personalized care scheme for the plant. Specifically, FIG. 2 shows a schematic flowchart of a personalized plant care method according to user needs provided by an embodiment of the present disclosure. This method may be implemented on an application (app) installed on a smart terminal such as a mobile phone or tablet computer. As shown in FIG. 2, the method includes:

Step S500: receiving plants added by the user and obtaining attribute information of the plants;

Step S600: determining the initial care scheme for the plant according to the attribute information of the plant;

Step S700: obtaining care skill level information of the current user and obtaining the user's care expectation for the plant to adjust the initial care scheme, so as to determine a personalized care scheme for the plant;

Step S800: outputting the personalized care scheme for the plant to the current user.

Next, the following descriptions will mainly focus on the differences between Example 1 and Example 2. Description of similar parts may be derived from Example 1, which will not be described again in Example 2.

After obtaining the current user's care skill level information, the information is utilized to adjust the initial care scheme, that is, care operations that do not meet the current user's care skill level are deleted from the scheme or the corresponding care operations are reduced, thereby determining the personalized care scheme for the plant, and the personalized care scheme for the plant is output to the current user. After obtaining the user's care skill level information and care expectations, a personalized care scheme for the plant may be customized for the user, that is, the preset initial care scheme is matched through the plant species to be taken care of and the user's care expectations, and the care scheme is adjusted based on the user's care skill level. The initial care scheme corresponding to different plant species and care expectations may be pre-stored in the database of the content management system (CMS). For example, if it is identified that the plant to be taken care of is Golden Pothos (*Epipremnum aureum*), and the user wants to hydroponic Pothos and has made a selection, the corresponding care scheme may be matched in the CMS and pushed to the user. In addition, corresponding to the identified user care ability label, the care scheme may also be adjusted. If the user does not have the ability to prune plants, the pruning step in the care scheme may be removed or replaced with other simple methods. It is also possible to use historical care data or plant status scores to determine the user's care skill level information to adjust the scheme, or interactive questions about care for Pothos may be utilized to determine the user's care skill level information, thereby adjusting the personalized care scheme for the plant.

In some embodiments, obtaining the user's care expectations for the plant includes:

providing care options in multiple desired forms for the current plant, and obtaining the user's selection result information, thereby determining the user's care expectations for the plant.

Care expectations refer to the care status or form of plant that the user hopes the plant can achieve after the care scheme is executed. For example, multiple forms of care schemes may be provided for the current plant submitted for confirmation by the user for the user to choose. A more common example is the shape control of succulents. For succulents, it is possible to adjust their shape, color, fullness, etc. by controlling watering, lighting, pruning, fertilization and other care steps. Therefore, multiple final forms of current succulent plants may be provided for users to choose from, and the personalized care scheme for the current succulents is adjusted according to the corresponding final form expected in the care expectations selected by the user.

For example, there is also a color scheme for hydrangeas. The color of hydrangeas is highly associated with the pH value of the soil. Hydrangeas bloom in alkaline soil with red flowers, while in acidic soil they bloom with blue flowers. In neutral soil, most hydrangeas have reddish flowers, and by adjusting the pH value of the soil, the color of the *hydrangea* may be adjusted to obtain the color desired by the user, thereby establishing a personalized care scheme for different users.

Moreover, there are different shapes of bonsai plants such as potted pine trees. Users may choose different care schemes that meet their care expectations based on the different shapes and display forms that are pushed.

Similarly, there are many different care methods for plants, such as potting, ground planting, hydroponics, climbing growth, etc., which may be selected according to the user's care expectations to match different personalized care schemes.

In some embodiments, obtaining the user's care expectations for the plant includes:

obtaining the desired form image of the plant provided by the user, and identifying the plant information and desired form in the desired form image, thereby determining the user's care expectations for the plant.

The user may provide the desired form image of the plant submitted for confirmation. The system uses the identification model to identify the species information, care method (indoor, outdoor, potted, hydroponics, soil culture, etc.) and the desired form of the user, and then formulates the corresponding care scheme. For example, the user submitted an image of potted blue *hydrangea*, and the system identified the plant as a *hydrangea* species, for which the care method is potting (*hydrangea* can be grown hydroponically), and the flower color is blue, thereby determining the user's care expectations in order to establish a personalized care scheme for the *hydrangea*.

Figure 4:
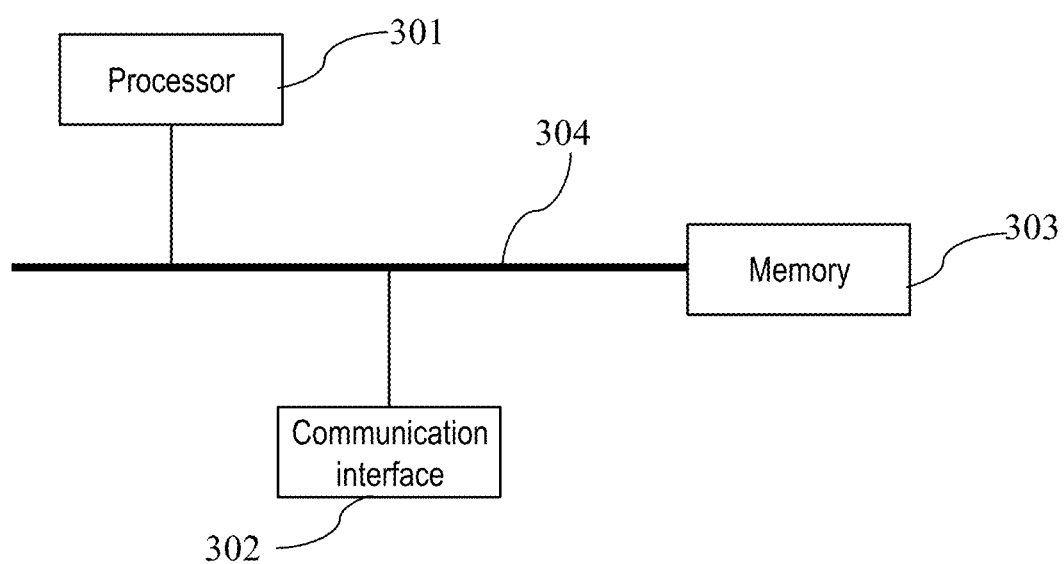
FIG. 4 is a schematic structural diagram of a personalized plant care system for assisting users in taking care of plants according to an embodiment of the present disclosure.

Based on the same inventive concept, the present disclosure also provides a personalized plant care system. Please refer to FIG. 4. FIG. 4 shows a schematic structural diagram of a personalized plant care system provided by an embodiment of the present disclosure. As shown in FIG. 4, the personalized plant care system includes a processor 301, a communication interface 302, a memory 303 and a communication bus 304.

The processor 301, the communication interface 302, and the memory 303 complete communication with each other through the communication bus 304.

The memory 303 is disposed to store computer programs.

When the processor 301 is disposed to execute the program stored in the memory 303, the following steps are implemented:

receiving a plant added by a user and obtaining attribute information of the plant;
determining an initial care scheme for the plant according to the attribute information of the plant;
obtaining care skill level information of the current user to adjust the initial care scheme, so as to determine a personalized care scheme for the plant;
outputting the personalized care scheme for the plant to the current user;
or, the following steps are implemented:
receiving a plant added by a user and obtaining attribute information of the plant;
determining an initial care scheme for the plant according to the attribute information of the plant;
obtaining care skill level information of the current user and obtaining the user's care expectation for the plant to adjust the initial care scheme, so as to determine a personalized care scheme for the plant;
outputting the personalized care scheme for the plant to the current user.

Descriptions for the specific implementation and related explanations of each step of the method may be derived from the method implementation shown in FIG. 1 and FIG. 2 above, and will not be repeated here.

Moreover, other implementation methods of the personalized plant care method implemented by the processor 301 executing the program stored in the memory 303 are the same as the implementation methods mentioned in the method implementation provided above, and will not be described again here.

The communication bus 304 mentioned in the above electronic device may be a Peripheral Component Interconnect (PCI) bus or an Extended Industry Standard Architecture (EISA) bus, etc. The communication bus 304 may be divided into an address bus, a data bus, a control bus, etc. For ease of illustration, only one thick line is used in the figure, but it does not mean that there is only one bus or one type of bus.

The communication interface 302 is disposed for communication between the above-mentioned electronic device and other devices.

The processor 301 may be a central processing unit (CPU), or other general-purpose processor, a digital signal processor (DSP), an application specific integrated circuit (ASIC), an off-the-shelf field-programmable gate array (FPGA) or other programmable logic devices, discrete gate or transistor logic devices, discrete hardware components, etc. The general-purpose processor may be a microprocessor or the processor may be any conventional processor, etc. The processor 301 is the control center of the electronic device and uses various interfaces and lines to connect various parts of the entire electronic device.

The memory 303 may be disposed to store the computer program. The processor 301 implements various functions of the electronic device by running or executing the computer program stored in the memory 303 and invoking the data stored in the memory 303.

The memory 303 may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain Synchlink DRAM (SLDRAM), memory bus (Rambus) direct RAM (RDRAM), direct memory bus dynamic RAM (DRDRAM), and memory bus dynamic RAM (RDRAM), etc.

The present disclosure further provides a readable storage medium in which a program is stored. When the program is executed, the following steps may be implemented:

receiving a plant added by a user and obtaining attribute information of the plant;
determining an initial care scheme for the plant according to the attribute information of the plant;
obtaining care skill level information of the current user to adjust the initial care scheme, so as to determine a personalized care scheme for the plant;

outputting the personalized care scheme for the plant to the current user;

alternatively, when the program is executed, the following steps may be implemented:

receiving a plant added by a user and obtaining attribute information of the plant;

determining an initial care scheme for the plant according to the attribute information of the plant;

obtaining care skill level information of the current user and obtaining the user's care expectation for the plant to adjust the initial care scheme, so as to determine a personalized care scheme for the plant;

outputting the personalized care scheme for the plant to the current user.

The computer-readable storage medium in the embodiment of the present disclosure may be any combination of one or more computer-readable media. The computer-readable medium may be a computer-readable signal medium or a computer-readable storage medium. The computer-readable storage medium may be, for example, but not limited to, an electrical, magnetic, optical, electromagnetic, infrared or semiconductor system, apparatus or device, or any combination thereof. More specific examples (non-exhaustive list) of a computer readable storage medium include: an electrical connection having one or more conductors, a portable computer hard drive, a hard drive, random access memory (RAM), read only memory (ROM), erasable programmable read-only memory (EPROM or flash memory), fiber optics, portable compact disk read-only memory (CD-ROM), optical storage devices, magnetic storage devices, or any suitable combination of the above. As described herein, a computer-readable storage medium may be any tangible medium that contains or stores a program for use by or in combination with an instruction execution system, apparatus, or device.

A computer-readable signal medium may include a data signal propagated in baseband or as part of a carrier wave carrying computer-readable program code therein. Such propagated data signals may come in many forms, including but not limited to electromagnetic signals, optical signals, or any suitable combination of the above. A computer-readable signal medium may also be any computer-readable medium other than a computer-readable storage medium that may send, propagate or transmit a program for use by or in connection with an instruction execution system, apparatus, or device.

Computer program code for performing the operations of the present disclosure may be written in one or more programming languages, or a combination thereof, including object-oriented programming languages such as Java, Smalltalk, C++, and conventional procedural programming language—such as "C" or similar programming language. The program code may execute entirely on the user's computer, partly on the user's computer, as a stand-alone software package, partly on the user's computer and partly on a remote computer or entirely on the remote computer or server. In situations involving remote computers, the remote computer may be connected to the user's computer through any kind of network, including a local area network (LAN) or a wide area network (WAN), or may be connected to an external computer (For example, using an Internet service provider for connection via the Internet).

It should be noted that the devices and methods disclosed in the embodiments of this article can also be implemented in other ways. The device implementation described above are only illustrative. For example, the flowcharts and block diagrams in the accompanying drawings show the possible implementation architecture, functions and operations of the devices, methods and computer program products according to various embodiments of the disclosure. In this regard, each block in the flowchart or block diagrams may represent a module, a program, or a portion of code that contains one or more executable instructions for implementing the specified logical functions. The module, program segment or part of the code contains one or more executable instructions for implementing the specified logical function. It should also be noted that, in some alternative implementations, the functions labeled in the block may occur out of the order noted in the figures. For example, two consecutive blocks may actually be executed substantially in parallel, or they may sometimes be executed in the reverse order, depending on the functionality involved. It will also be noted that each block in the block diagram and/or flowchart illustration and combinations of blocks in the block diagram and/or flowchart illustration can be implemented through a dedicated hardware-based systems that perform the specified functions or operations, or may be implemented using a combination of dedicated hardware and computer instructions.

In addition, each functional module in each embodiment of the disclosure can be integrated together to form an independent part, each module can exist alone, or two or more modules can be integrated to form an independent part.

The above description is only a description of the preferred embodiments of the present disclosure and does not limit the scope of the present disclosure in any way. Any changes or modifications made by those of ordinary skill in the field of the present disclosure based on the above disclosure shall fall within the scope of the claims.

What is claimed is:

1. A personalized plant care method for assisting a user, adapted a personalized plant care system, wherein the personalized plant care system comprises a memory storing a program, the personalized plant care method comprising:

receiving a plant added by the user and obtaining attribute information of the plant;

determining an initial care scheme for the plant according to the attribute information of the plant;

obtaining care skill level information of a current user to adjust the initial care scheme, so as to determine a personalized care scheme for the plant;

outputting the personalized care scheme for the plant to the current user;

wherein determining the initial care scheme for the plant and outputting the personalized care scheme for the plant to the current user comprises:

obtaining care skill level information of a current user and obtaining a care expectation of the user for the plant to adjust the initial care scheme, so as to determine a personalized care scheme for the plant;

wherein the personalized plant care system comprises a particular machine to implement the personalized care scheme to control at least one of watering, lighting, pruning, and fertilization for adjusting a shape, a color, or a fullness of succulents;

outputting the personalized care scheme suitable for the plant to the current user;

wherein receiving the plant added by the user and obtaining the attribute information of the plant comprises one of following:

receiving a plant picture added by the user, identifying and obtaining the attribute information of the plant in the plant picture;

wherein receiving the plant picture added by the user, identifying and obtaining the attribute information of the plant in the plant picture comprises:
  identifying the attribute information of the plant in the plant picture based on a species identification model established through pre-sample training.

2. The personalized plant care method for assisting the user according to claim 1, wherein receiving the plant added by the user and obtaining the attribute information of the plant comprises one of following:
  receiving a historical plant identification result added by the user, and obtaining attribute information of a historical identified plant;
  receiving a searched plant result added by the user, and obtaining attribute information of the searched plant.

3. The personalized plant care method for assisting the user according to claim 1, wherein the attribute information of the plant comprises species name information and growth phase information of the plant.

4. The personalized plant care method for assisting the user according to claim 3, wherein the attribute information of the plant further comprises plant status information.

5. The personalized plant care method for assisting the user according to claim 1, wherein determining the initial care scheme for the plant based on the attribute information of the plant further comprises:
  determining the initial care scheme for the plant based on the attribute information of the plant, location information and/or current time information of the user.

6. The personalized plant care method for assisting the user according to claim 1, wherein the care skill level information is confirmed based on historical care information of the current user.

7. The personalized plant care method for assisting the user according to claim 6, wherein confirming the care skill level information based on the historical care information of the current user comprises:
  confirming the care skill level information of the user based on type information of historical care plant of the current user and/or a historical care data of the current user.

8. The personalized plant care method for assisting the user according to claim 7, wherein confirming the care skill level information based on the historical care information of the current user further comprises:
  obtaining a historical care operation label of the current user to confirm the care skill level information of the user.

9. The personalized plant care method for assisting the user according to claim 1, wherein the care skill level information is confirmed based on interactive question answer information and/or customized care capability label information submitted by the current user.

10. The personalized plant care method for assisting the user according to claim 1, wherein the personalized plant care method for assisting the user further comprises:
  obtaining care environment information of the user to adjust the initial care scheme, thereby determining the personalized care scheme for the plant.

11. The personalized plant care method for assisting the user according to claim 1, wherein when the user has a plurality of maintained plants, making an overall adjustment to an associated personalized care scheme for the plurality of maintained plants by the user.

12. The personalized plant care method for assisting the user according to claim 1, wherein the method further comprises: making regular return visits to the user to obtain a growth status of the plant, and adjusting the personalized care scheme for the plant according to the growth status of the plant.

13. The personalized plant care method for assisting the user according to claim 1, wherein obtaining the care expectation of the user for the plant comprises:
  providing care options in a plurality of desired forms for a current plant, and obtaining selection result information of the user, thereby determining the care expectation of the user for the plant.

14. The personalized plant care method for assisting the user according to claim 1, wherein obtaining the care expectation of the user for the plant comprises:
  obtaining a desired form image of the plant provided by the user, and identifying plant information and a desired form in the desired form image, thereby determining the care expectation of the user for the plant.

15. A personalized plant care system, comprising a processor and a memory, wherein a program is stored in the memory, when the program is executed by the processor, the personalized plant care method according to claim 1 is implemented.

16. A non-transitory computer readable storage medium, in which a program is stored, wherein when the program is executed, the personalized plant care method according to claim 1 is implemented.

\* \* \* \* \*